US006420794B1

United States Patent
Cao

(10) Patent No.: US 6,420,794 B1
(45) Date of Patent: Jul. 16, 2002

(54) HYDROPOWER CONVERSION SYSTEM

(76) Inventor: Thanh D. Cao, 529 E. Washington Blvd. #6, Pasadena, CA (US) 91104

( * ) Notice: Subject to any disclaimer, the term of this patent is extended or adjusted under 35 U.S.C. 154(b) by 0 days.

(21) Appl. No.: 09/822,381

(22) Filed: Mar. 30, 2001

Related U.S. Application Data

(63) Continuation of application No. 09/709,620, filed on Nov. 9, 2000.
(60) Provisional application No. 60/213,857, filed on Jun. 23, 2000.

(51) Int. Cl.[7] ............................................. F03B 13/10
(52) U.S. Cl. .......................... 290/43; 290/44; 290/52; 60/398
(58) Field of Search ........................... 290/43, 54, 44, 290/52, 53, 42, 55; 60/497, 398, 413; 417/330, 334

(56) References Cited

U.S. PATENT DOCUMENTS

| | | | |
|---|---|---|---|
| 3,939,356 A | 2/1976 | Loane | 290/52 |
| 4,058,979 A | 11/1977 | Germain | 60/327 |
| 4,109,160 A * | 8/1978 | Goto et al. | 290/52 |
| 4,132,901 A * | 1/1979 | Crausbay | 290/53 |
| 4,236,083 A | 11/1980 | Kenney | 290/55 |
| 4,258,269 A | 3/1981 | Tsubota | 290/53 |
| 4,321,475 A | 3/1982 | Grüb | 290/52 |
| 4,398,095 A * | 8/1983 | Ono | 290/53 |
| 4,433,248 A | 2/1984 | Marks | 290/44 |
| 4,698,516 A | 10/1987 | Thompson | 290/54 |
| 5,027,000 A | 6/1991 | Chino et al. | 290/53 |
| 5,132,550 A | 7/1992 | McCabe | 290/53 |
| 5,384,489 A | 1/1995 | Bellac | 290/44 |
| 5,742,515 A * | 4/1998 | Runkle et al. | 364/528.22 |
| 5,872,406 A | 2/1999 | Ullman et al. | 290/53 |
| 6,023,105 A * | 2/2000 | Youssef | 290/54 |
| 6,051,892 A * | 4/2000 | Toal, Sr. | 290/43 |

FOREIGN PATENT DOCUMENTS

| | | | |
|---|---|---|---|
| FR | 2 473 640 | * | 7/1981 |
| JP | 406137255 | * | 5/1994 |
| JP | 407039198 | * | 2/1995 |

* cited by examiner

Primary Examiner—Joseph Waks
(74) Attorney, Agent, or Firm—Christie, Parker & Hale, LLP

(57) ABSTRACT

A hydropower conversion system for circulation of water between a delivering reservoir (101 or 201) and a receiving reservoir (102 or 202) through hydro-turbines (112 or 212), pumps (122 or 222), and back-up reservoir (104 or 204). Water in the delivering reservoir is maintained at a constant functioning level by adjusting valve (AV) linked with valve control mechanism (VCM) to adjust the opening and closing of passages (105 or 205) conducting water flowing from the back-up reservoir into the delivering reservoir. Outlets (106 or 206) allow excess water to flow out of the back-up reservoir back down to the receiving reservoir. The hydro-turbines are connected to power machinery (141 or 241). The pumps are driven by a natural energy source (151 or 251). In one embodiment, the receiving and delivering reservoirs are structurally connected; in another embodiment, the two reservoirs are separate reservoirs.

20 Claims, 2 Drawing Sheets

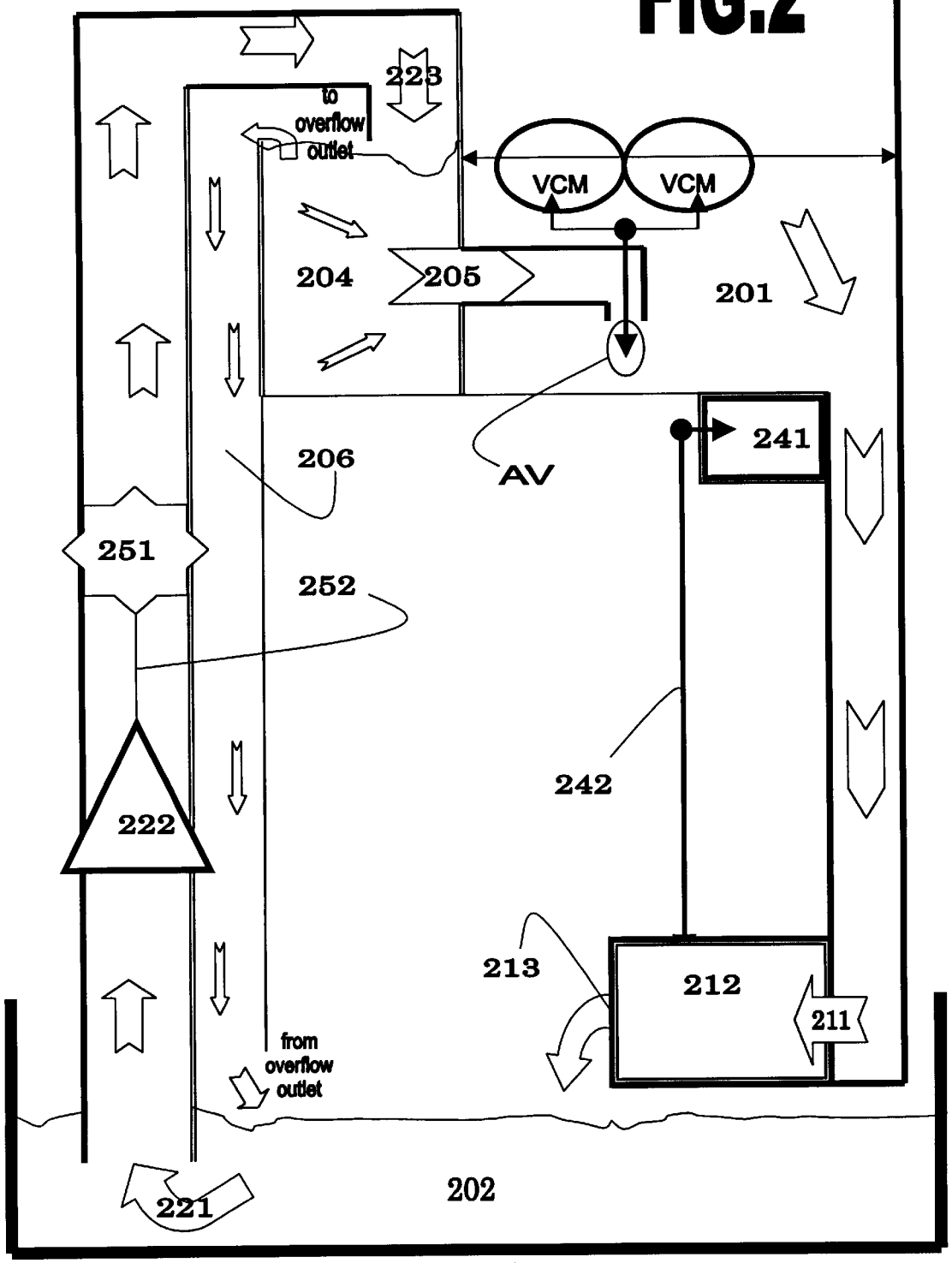

HYDROPOWER CONVERSION SYSTEM

CROSS-REFERENCE TO RELATED APPLICATION(S)

This application is a continuation application of U.S. patent application Ser. No. 09/709,620, filed Nov. 9, 2000, which claimed priority of U.S. Provisional Application No. 60/213,857, filed Jun. 23, 2000

FIELD OF THE INVENTION

Energy is plentiful in winds, sunlight, waves and tidal changes. However, these natural sources of energy vary erratically with seasons and weather conditions. Therefore, a direct conversion of the energy into power of useful form is impractical, because the requirement for storage and modulation makes the conversion inefficient and costly. By means of the hydro-turbine, this invention introduces an uncomplicated and practical way to convert the energy in erratic natural sources into power of useful steady form. The power of steady form can be used to generate electricity or activate machinery, such as the drill of an oilrig or the conveyor belt that moves a production line in a factory.

BACKGROUND OF THE INVENTION

The building of dams for electricity requires enormous undertakings in labor and cost, and causes ecological hazards, such as floods, destruction of wild life habitats and cultural lands, and so on. The conversion of power from fuel combustion generates unacceptable pollution. The conversion of nuclear power is unacceptable, not only because construction and maintenance costs are enormous, but also because the technologies in managing radioactive wastes and in preventing a disastrous incident of core melt down have been uncertain and, therefore, unreliable. Conventional conversion of winds directly into electricity, by means of wind-turbines, is impractical because it is complicated with the problems of storage and modulation to transform the irregularly generated currents, due to erratic wind speeds, into currents of useful form. Furthermore, a large area of suitable wind condition, such as one on the outskirts of Palm Desert, Calif., is needed for the installations of several hundreds of wind turbines to provide only limited supply of electricity. The conversion of energy from sunlight, waves and tidal changes is also complicated with the problems of storage and modulation, because, like the winds, these natural sources of energy vary erratically.

SUMMARY OF THE INVENTION

To power the water pumps, input energy is derived from erratic natural sources, such as winds, sunlight, waves, tidal changes, etc. The water pumps move water upward, from a receiving reservoir through a back-up reservoir into a delivering reservoir. The surface of water in the delivering reservoir is maintained at a constant functioning level. From the delivering reservoir, the downward water flow rotates a hydro-turbine. Due to the constant functioning level of water in the delivering reservoir, energy output, from the hydro turbine, is in a steady state. The output energy is used to power machinery such as an electric generator, an oil drill or a conveyor belt.

BRIEF DESCRIPTION OF THE DRAWINGS

FIG. 2 is a schematic view of the second embodiment of the present invention in which the receiving and delivering reservoirs are two separate reservoirs.

DETAILED DESCRIPTION OF THE INVENTION

Figure 1:
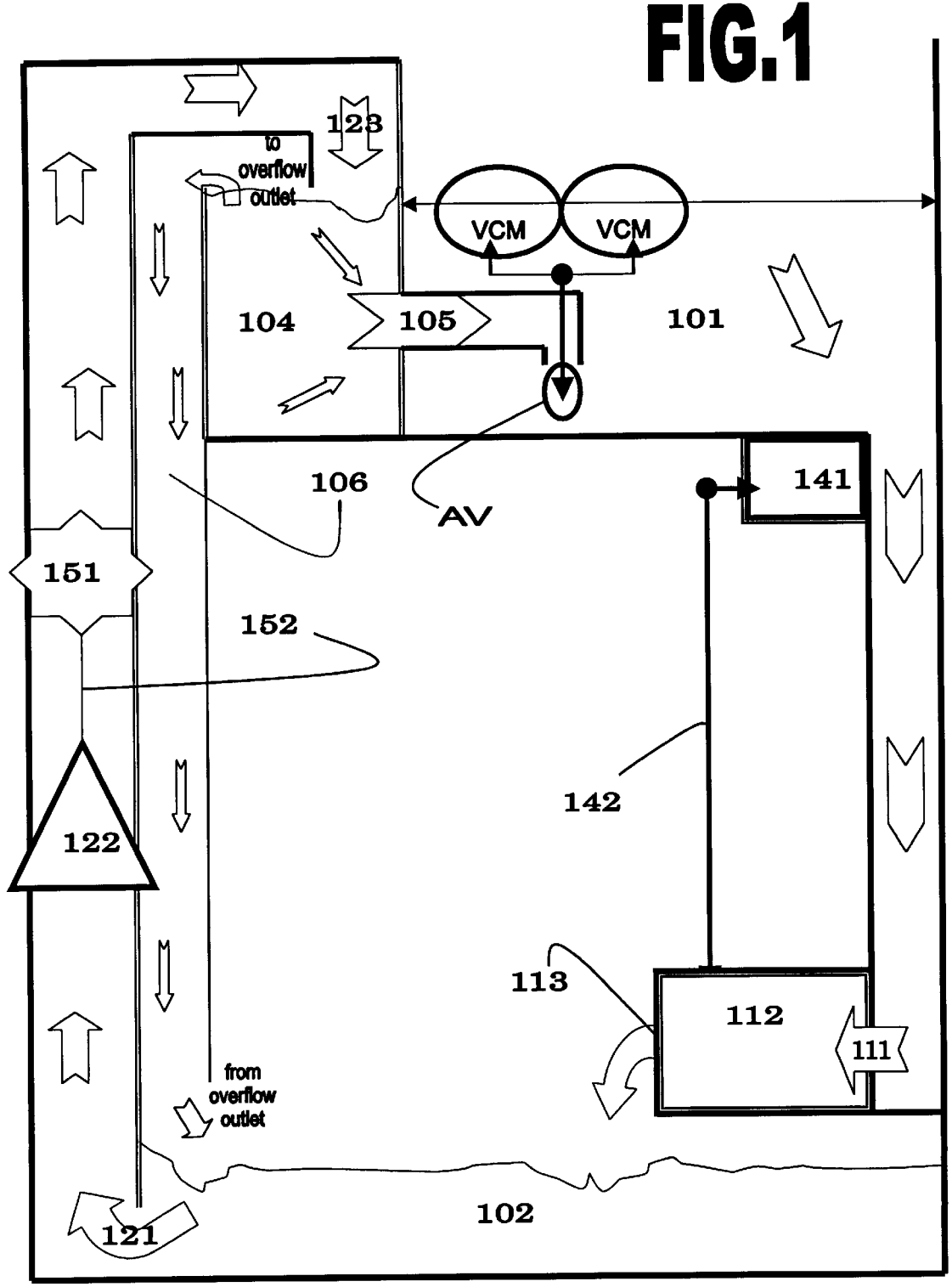
FIG. 1 is a schematic view of the first embodiment of the present invention in which the receiving and delivering reservoirs are structurally connected, e.g. by the common sidewalls.

With the arrows indicating the directions of water flows and horizontal wavy lines representing water surfaces, FIG.1 is a schematic description of the hydropower conversion system in its first embodiment. According to the present invention, from delivering reservoir 101, the down-flowing water enters inlet 111, passes through hydro turbine 112 under high pressure, and exits through outlet 113 into receiving reservoir 102. The high-pressure flow rotates the hydro turbine. Connector 142 transmits rotation of the hydro-turbine to machinery 141; the connector can be a drive shaft, a belt or a chain.

Pump 122 moves water in receiving reservoir 102 through inlet 121 up to back-up reservoir 104 through outlet 123. Pump 122 is connected to power source 151 by connector 152. If pump 122 is a system of electric water pumps, then power source 151 is a system of electric generators, and connector 152 is conducting electrical cables. The electric generators of power source 151 are charged by wind turbines or solar cells, or by a combination of both. If pump 122 is driven by a windmill, then power source 151 is the turbine of the windmill, and connector 152 can be a drive shaft, a belt or a chain. The system of pump 122 may also include other type of water pumps running on other sources of energy, such as the energy from waves, tidal changes, geo-thermal steam, etc.

In the case where back-up reservoir 104 is exceedingly too high above receiving reservoir 102, water will first be pumped into additional reservoirs at intermediate elevations (not shown). Then, from the intermediate reservoirs, the water is pumped further up to back-up reservoir 104.

Passage 105 conducts the flow of water from back-up reservoir 104 into delivering reservoir 101.

Maintaining the water surface in delivering reservoir 101 at a constant functioning level is necessary to keep the rotational speed of hydro-turbine 112 constant, so that the power output from machinery 141 remains in its useful steady state. Adjusting Valve AV adjusts the opening and closing of passage 105 to maintain the water surface at a constant functioning level in the delivering reservoir. AV is linked to move up and down with the floating spheres of Valve Control Mechanism VCM. When the water level begins to drop, valve AV begins to move down and open the passage to allow more water flowing into the delivering reservoir. When the water level begins to rise, valve AV begins to move up and close the passage to prevent water from flowing into the delivering reservoir. In back-up reservoir 104, excess water flows out through outlet 106 and back down to receiving reservoir 102.

With the arrows indicating the directions of water flows and horizontal wavy lines representing water surfaces, FIG. 2 is a schematic description of the hydropower conversion system in its second embodiment. According to the present invention, from delivering reservoir 201, the down-flowing water enters inlet 211, passes through hydro turbine 212 under high pressure, and exits through outlet 213 into receiving reservoir 202. The high-pressure flow rotates the hydro turbine. Connector 242 transmits rotation of the hydro-turbine to machinery 241; the connector can be a drive shaft, a belt or a chain.

Pump 222 moves water in receiving reservoir 202 through inlet 221 up to back-up reservoir 204 through outlet 223.

Pump 222 is connected to power source 251 by connector 252. If pump 222 is a system of electric water pumps, then power source 251 is a system of electric generators, and connector 252 is conducting electrical cables. The electric generators of power source 251 are charged by wind turbines or solar cells, or by a combination of both. If pump 222 is driven by a windmill, then power source 251 is the turbine of the windmill, and connector 252 can be a drive shaft, a belt or a chain. The system of pump 222 may also include other type of water pumps running on other sources of energy, such as the energy from waves, tidal changes, geo-thermal steam, etc.

In the case where back-up reservoir 204 is exceedingly too high above receiving reservoir 202, water will first be pumped into additional reservoirs at intermediate elevations (not shown). Then, from the intermediate reservoirs, the water is pumped further up to back-up reservoir 204.

Passage 205 conducts the flow of water from back-up reservoir 204 into delivering reservoir 201.

Maintaining the water surface in delivering reservoir 201 at a constant functioning level is necessary to keep the rotational speed of hydro-turbine 212 constant, so that the power output from machinery 241 remains in its useful steady state. Adjusting Valve AV adjusts the opening and closing of passage 205 to maintain the water surface at a constant functioning level in the delivering reservoir. AV is linked to move up and down with the floating spheres of Valve Control Mechanism VCM. When the water level begins to drop, valve AV begins to move down and open the passage to allow more water flowing into the delivering reservoir. When the water level begins to rise, valve AV begins to move up and close the passage to prevent water from flowing into the delivering reservoir.

In back-up reservoir 204, excess water flows out through outlet 206 and back down to receiving reservoir 202.

In both embodiments, the hydropower conversion system is essentially a self-contained system, because all the water draining down, out of the hydro-turbines and overflow outlets into the receiving reservoir, is pumped back up through the back-up reservoir into the delivering reservoir to form a closed loop circulation. A self-contained system, as such, does not need to communicate with an external source to operate, e.g. a down-flowing stream to drain the water from the hydro turbine, or a body of water upstream to feed the hydro turbine. Therefore, a hydropower conversion system of the present invention is not a supportive device adapted to assist an existing hydropower plant, but is a self-sufficient independent system to provide power, mechanical or electrical, to residents in areas inaccessible to an existing power plant, such as on an offshore oilrig or a remote island, or in the middle of a desert. Also for being self-contained, capacity of the system can vary not only with the size of a unit system, but also with the number of installed units to meet various demands, large or small, i.e. for a single house-hold, a community or a city block, and more.

A system of the first embodiment is suitable for an offshore installation, where its structure is inserted in the ocean such that the surface level of water in the receiving reservoir is closed to the ocean floor, and the surface level of water in the delivering reservoir is at sea level. When the water is exceedingly deep, water in the receiving reservoir is pumped first to intermediate reservoirs, and from the intermediate reservoirs, the water will then be pumped to the back-up reservoir. In a river, for instant, the system structure can be inserted through the river bed such that the level of water in the receiving reservoir is below the bottom of the river in order to have a sufficient elevation of the surface level of water in the delivering reservoir from that of water in the receiving reservoir to provide adequate pressure for the flow of water through the hydro turbine. On flat land, water from a nearby natural water body can be channeled into a man-made water body prepared at a location where the condition is favorable for the installation of a hydropower conversion system. A favorable condition involves the availability of natural sources of energy, such as winds and/or sunlight, to make sure that the water pumps are provided with adequate energy to effectively move water from receiving reservoir 102 up to back-up reservoir 104.

A system of the second embodiment is suitable for an on-shore installation, where the delivering reservoir is positioned on the top of a cliff, and the receiving reservoir, at the foot. When the cliff is exceedingly high, water in the receiving reservoir is pumped first to intermediate reservoirs, and from the intermediate reservoirs, the water will then be pumped to the back-up reservoir. The level of water in the receiving reservoir is not a problem in this embodiment; the reservoir can always be situated sufficiently far below the hydro turbine to prevent water from reaching outlet 213 and flooding the turbine. Since water in the receiving reservoir is pumped to replenish the delivering reservoir, the receiving reservoir can be situated inside a natural water body to guarantee a sufficient water supply; if the water body is an ocean or river, passages, which bring water from the water body into the receiving reservoir, are leveled with the water surface at high tide so that water level in the reservoir does not drop with the low tide in the water body. Furthermore, filters can be installed at the opening of passages to screen off debris in order to prevent stagnation and damages to the pump. A simpler version of the system is one, which utilizes a natural water body as the receiving reservoir; in this case, tidal changes must be moderate, and the water must be sufficiently free from debris. The monumental sight of a hydro power plant, such as Hoover Dam near Las Vegas, Nev., may have created a false impression that conversion of hydropower involves enormous displacement of water across the dam. Hypothetically, under such a tremendous water pressure at the base of the dam, the displacement would be enormous if the flow were unobstructed through hollow passages, and water would shoot out of the hollow passages like jet streams from fire hydrants. In generating electricity, however, most kinetic energy of the water flow is absorbed in rotating the hydro-turbines; therefore, the actual amount of displaced water is fractional as compared to that in the case of unobstructed flow. Evidently, the displaced water can be regulated to pour out of the turbine at moderate rates. For a system of the present invention, which is thousands of times smaller than a conventional hydro power plant, the amount of water displaced through a hydro-turbine is relatively minimal, and can easily be managed, i.e., removed or replenished, with the use of water pumps. The size and number of water pumps will be determined according to the amount of displaced water. More pumps, of the same or different types, can always be added to increase pumping capacity. Electric pumps, running on electricity generated from wind turbines or solar cells, are well developed and popular on current markets. Ultimately, the type of pumps to be used will depend on the availability of the energy sources at the site. Besides winds and sunlight, pumping energy can also be derived from waves, tidal changes, geo-thermal steam, etc.

What is claimed is:

1. A hydropower conversion system comprising:
   a body of water being a delivering reservoir;
   a body of water being a receiving reservoir;
   a hydro-turbine rotated by water flowing from the delivering reservoir to the receiving reservoir;
   a machinery connected to be driven by the hydro-turbine;
   a means for moving water from the receiving reservoir to the delivering reservoir;
   a body of water being a back-up reservoir;
   a passage between the back-up reservoir and the delivering reservoir, the passage allowing water to flow between said back-up reservoir and said delivering reservoir;
   a functioning level of water in the delivering reservoir located between a bottom of the back-up reservoir and an overflow outlet in said back-up reservoir; and
   means for fixing a distance between said functioning level of water in the delivering reservoir and a rotational axis of the hydro-turbine to sustain rotation of said hydro-turbine at a constant speed.

2. The system of claim 1 wherein said machinery driven by said hydro-turbine is an electric generator.

3. The system of claim 1 wherein the means for moving water from said receiving reservoir to said delivering reservoir is a pump driven by a wind turbine.

4. The system of claim 1 wherein the means for moving water from said receiving reservoir to said delivering reservoir is an electric solar pump.

5. The system of claim 1 wherein the means for moving water from said receiving reservoir to said delivering reservoir is a pump driven by energy derived from tidal changes.

6. A self-contained hydropower conversion system comprising:
   a body of water being a delivering reservoir;
   a body of water being a receiving reservoir;
   a hydro-turbine rotated by water flowing from the delivering reservoir to the receiving reservoir;
   a machinery connected to be driven by the hydro-turbine;
   means for moving water from the receiving reservoir to the delivering reservoir;
   a body of water being a back-up reservoir;
   a passage between the back-up reservoir and the delivering reservoir allowing water to flow between said back-up reservoir and said delivering reservoir; and
   an outlet conducting an excess of water out of the back-up reservoir back to the receiving reservoir.

7. The system of claim 6 wherein said machinery driven by the hydro-turbine is an electric generator.

8. The system of claim 6 wherein the means for moving water from said receiving reservoir to said delivering reservoir is a pump driven by a wind turbine.

9. The system of claim 6 wherein the means for moving water from said receiving reservoir to said delivering reservoir is an electric solar pump.

10. The system of claim 6 wherein the means for moving water from said receiving reservoir to said delivering reservoir is a pump driven by energy derived from tidal changes.

11. A self-contained hydropower conversion system comprising:
    a body of water being a delivering reservoir;
    a body of water being a receiving reservoir;
    a hydro-turbine rotated by water flowing from the delivering reservoir to the receiving reservoir;
    a machinery connected to be driven by the hydro-turbine;
    means for moving water from the receiving reservoir to the delivering reservoir;
    a body of water being a back-up reservoir;
    a passage between the back-up reservoir and the delivering reservoir allowing water to flow between said back-up reservoir and said delivering reservoir;
    an outlet conducting an excess of water out of the back-up reservoir back to the receiving reservoir;
    a functioning level of water in the delivering reservoir; and
    means for fixing a distance between said functioning level of water in the delivering reservoir and a rotational axis of the hydro-turbine to sustain rotation of said hydro-turbine at a constant speed.

12. The system of claim 11 wherein said machinery driven by the hydro-turbine is an electric generator.

13. The system of claim 11 wherein the means for moving water from said receiving reservoir to said delivering reservoir us a pump driven by a wind turbine.

14. The system of claim 11 wherein the means for moving water from said receiving reservoir to said delivering reservoir is an electric solar pump.

15. The system of claim 11 wherein the means for moving water from said receiving reservoir to said delivering reservoir is a pump driven by energy derived from tidal changes.

16. The system of claim 11 wherein the means for moving water from said receiving reservoir to said delivering reservoir is a pump driven by energy derived from water waves.

17. The system of claim 11 wherein the means for moving water from said receiving reservoir to said delivering reservoir is a pump driven by energy derived from a geothermal source.

18. The system of claim 11 wherein the means for fixing the distance between said functioning level of water and said rotational axis is a system of adjusting valve and valve control mechanism to control a rate of water flow into the delivering reservoir.

19. The system of claim 11 wherein the receiving reservoir and the delivering reservoir are structurally connected.

20. The system of claim 11 wherein the receiving reservoir and the delivering reservoir are structurally connected.

* * * * *